J. H. RYALS.
WIRE STRETCHER.
APPLICATION FILED JUNE 5, 1920.
1,401,739.
Patented Dec. 27, 1921.
2 SHEETS—SHEET 1.
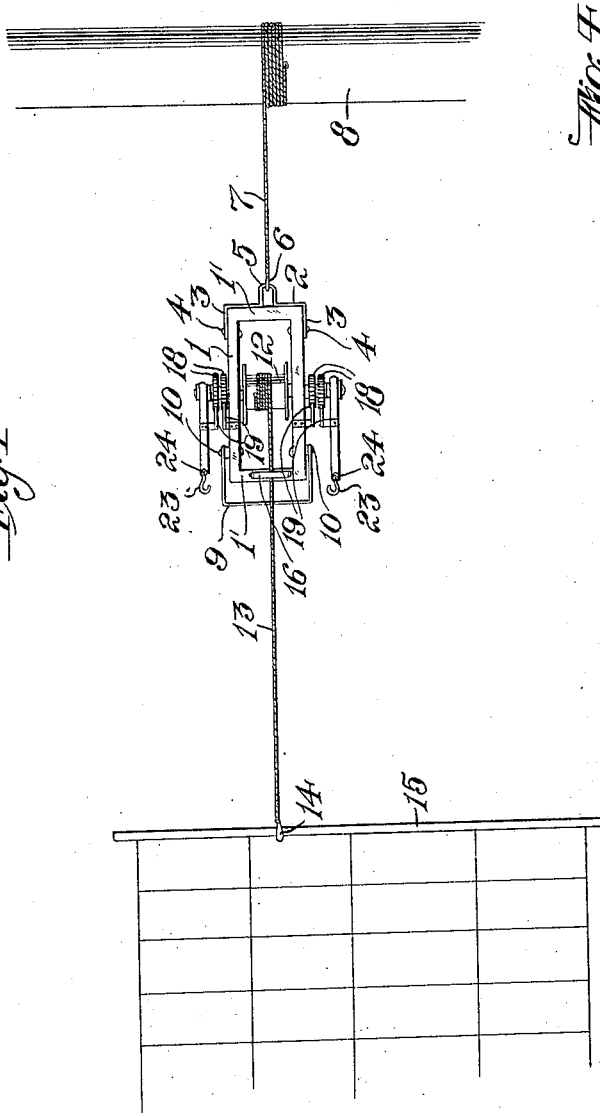
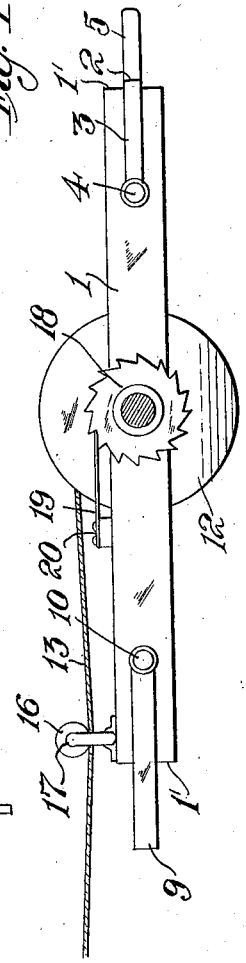
Inventor
J. H. Ryals
By Franklin H. Hough
Attorney

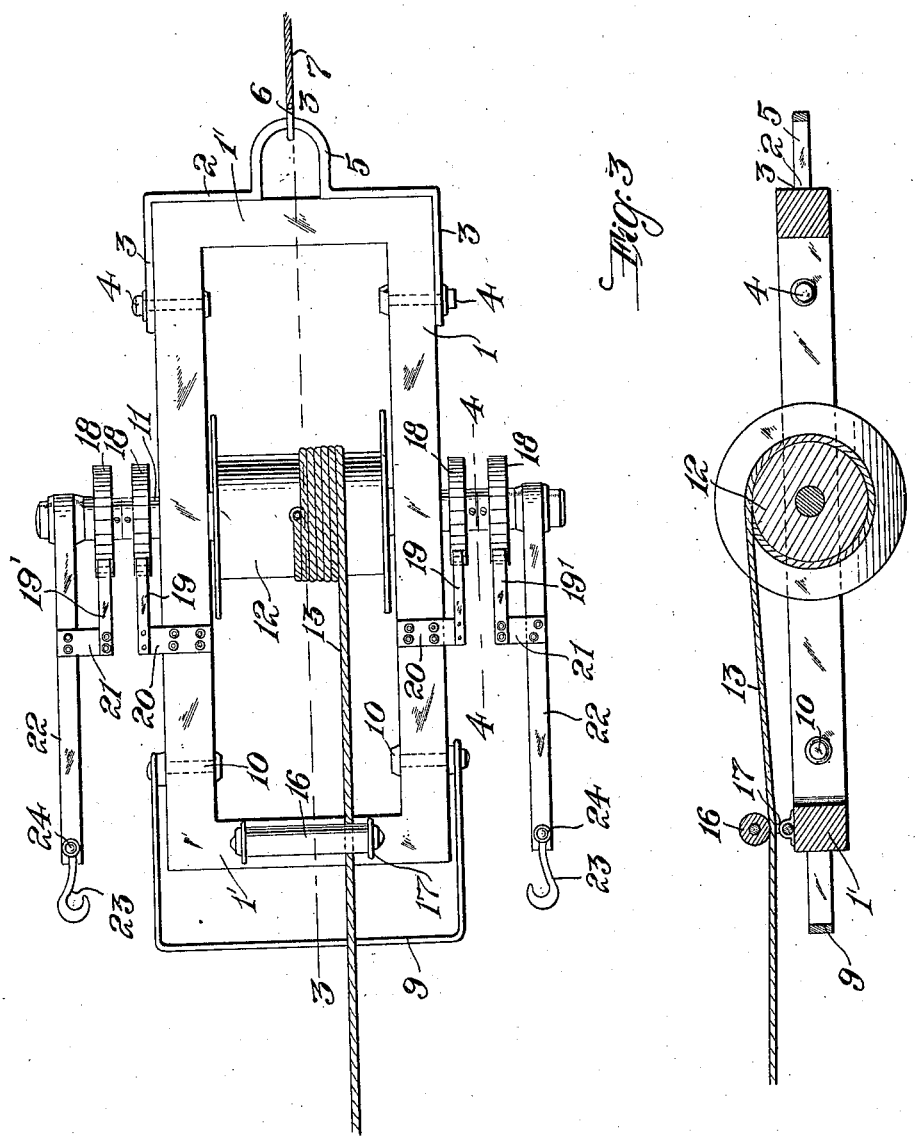

UNITED STATES PATENT OFFICE.

JESSE HYRAM RYALS, OF INVERNESS, FLORIDA, ASSIGNOR OF ONE-HALF TO GEORGE W. SCOFIELD, OF INVERNESS, FLORIDA.

WIRE-STRETCHER.

1,401,739.    Specification of Letters Patent.    Patented Dec. 27, 1921.

Application filed June 5, 1920. Serial No. 386,799.

*To all whom it may concern:*

Be it known that I, JESSE HYRAM RYALS, a citizen of the United States, residing at Inverness, in the county of Citrus and State of Florida, have invented certain new and useful Improvements in Wire-Stretchers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel construction of device for stretching wire fences and various other objects, and which may also be used to pull up small trees, etc; and the invention is designed to provide a device which is compact in organization, which is easily operated, and which is thoroughly efficient in use.

With this object in view, the invention resides in the novel construction, combination and arrangement of parts hereinafter fully described in the specification, summed up in the claim and disclosed in the drawings.

The accompanying drawings clearly disclose the preferred form of embodiment of my invention; but it is to be understood that various changes may be made in the physical embodiment, within the terms of the appended claim, without departing from the spirit of the invention, or necessarily sacrificing any of its advantages, such changes being within the scope of the invention.

Briefly described: Figure 1 is a view, in top plan, of the device of my invention, showing one application of use thereof.

Fig. 2 is a view, in top plan, on a large scale of said device.

Fig. 3 is a view, in longitudinal section, taken on the line 3—3 of Fig. 2, and

Fig. 4 is a sectional view on the line 4—4 of Fig. 2.

Referring now in detail to the drawings:

1 designates a frame which may be of any suitable form and construction, and which is preferably rectangular comprising, as shown, the two longitudinal side bars and the two end bars and being preferably constructed of some strong metal, such as steel.

Secured to one end of said frame 1 is a bar 2, having the angled terminals 3, 3 disposed against the longitudinal side bars of the frame, and is secured thereto by means of bolts 4. Centrally of the length of the end bar 1' of the frame, the bar 3 is bent into the form of a loop 5, which may be engaged by the hook 6 of a cable 7, which may be secured to a stationary support 8 after being wound therearound, as shown in Fig. 1, thus securing the frame against movement in a direction away from said support 8.

Carried by the frame 1, at the other end thereof, is a bail 9, the ends of which are secured by means of bolts 10 to the side members of the frame 1. This bail may be engaged in use by a brace or support to hold the stretching device level with the fence or other object being operated upon. Extending transversely of the side members of the frame 1 and being suitably rotatably journaled therein, is a shaft or axle 11, on which is fast a drum 12 disposed, as shown, between the longitudinal side members of the frame 1. Wound upon and secured at one end to said drum, is a cable 13, the other end of which may carry a hook 14 engageable with the fence 15, as shown in Fig. 1. The cable, preferably, passes beneath an anti-friction roller 16 supported upon the corresponding end bar 1' of the frame 1 by means of the brackets 17.

Fast on the exteriorly projecting ends of the shaft 11 are two pairs of ratchet wheels 18 engageable by pawls 19 and 19'. The pawl 19 is preferably of spring material and is supported at one end by being secured to the end of the bracket 20, secured to one of the longitudinal side bars of the frame 1. The other pawl 19', of each pair of pawls, is supported on the end of a similar bracket 21 secured at its opposite end to a lever 22 intermediate the ends thereof, said lever being fulcrumed at one end thereof upon the shaft 11. Said lever 22 is loosely mounted upon said shaft, so that movement of the lever will not effect rotation of the shaft. Each lever 22 carries at one end a hook 23 which is pivoted at one end thereof, as shown at 24, to one end of said lever.

In operation, the cable 13 is wound upon the drum 12 to stretch the wire fence 15 by pulling upward upon the lever 22, which, by reason of the engagement of the pawl 19', carried by said lever, with the ratchet wheel 18, will partially rotate the shaft 11. Said lever is then moved in the reverse direction, the pawl 19' trailing over the teeth of the ratchet wheel 18, and the pawl 19 by engaging with the teeth of the adjacent ratchet wheel 18, maintaining the shaft, and thus the drum 12, against retrograde movement. Should the retaining pawls 19, 19 break after the drum 12 has been revolved to wind the cable 13 and stretch the wire fence 15, the hooks 23, 23 are engaged with a support to prevent movement of the levers 22 in a direction to unwind the drum 12.

It will be apparent that the stretching device, just described, may be operated by one man moving one of the levers 22, or two men may operate the stretching device, each man using one of the levers 22.

What I claim to be new is:

A stretcher comprising a substantially rectangular frame, a shaft journaled transversely of and having its ends extending laterally beyond the lines of the frame, a winding drum rigid upon the shaft and substantially spanning the space between the side bars of the frame, a pair of ratchets mounted upon the shaft upon the exterior of the frame at each end, pawls carried by the frame engaging with the proximate ratchets, levers pivoted upon the shaft at its remote ends, and pawls carried by the levers engaging the remote ratchets.

In testimony whereof I hereunto affix my signature.

JESSE HYRAM RYALS.